No. 725,448. PATENTED APR. 14, 1903.
A. L. JOHNSON.
CULTIVATOR SHOVEL.
APPLICATION FILED DEC. 19, 1902.
NO MODEL.

Witnesses
Harry L. Amy
Herbert D. Lawson

Inventor
Alvis L. Johnson,
By Victor J. Evans
Attorney

UNITED STATES PATENT OFFICE.

ALVIS L. JOHNSON, OF SIPE SPRINGS, TEXAS.

CULTIVATOR-SHOVEL.

SPECIFICATION forming part of Letters Patent No. 725,448, dated April 14, 1903.

Application filed December 19, 1902. Serial No. 135,923. (No model.)

*To all whom it may concern:*

Be it known that I, ALVIS L. JOHNSON, a citizen of the United States, residing at Sipe Springs, in the county of Comanche and State of Texas, have invented new and useful Improvements in Cultivator-Shovels, of which the following is a specification.

My invention relates to new and useful improvements in cultivators especially adapted for use in the cultivation of corn and cotton, and is more especially an improvement in shovels for the cultivator which are so constructed as to be employed either for opening furrows or for scraping.

The object is to provide a shovel of simple construction which may be readily adjusted upon its supporting-foot, so as to be used for either of the purposes above mentioned.

Another object is to so mount the same as to enable it to be adjusted to any desired angle in relation to the foot.

With the above and other objects in view the invention consists in the further novel construction and combination of parts hereinafter more fully described and claimed, and illustrated in the accompanying drawings, showing the preferred form of my invention, and in which—

Figure 1:
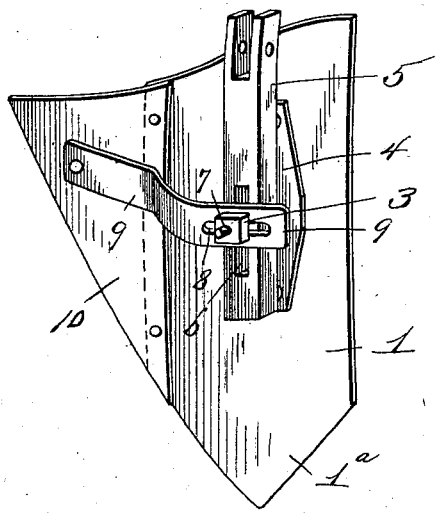
Figure 2:
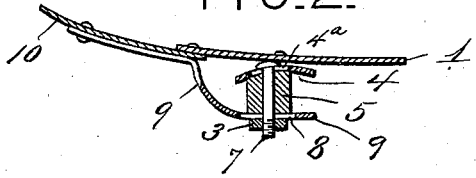
Figure 3:
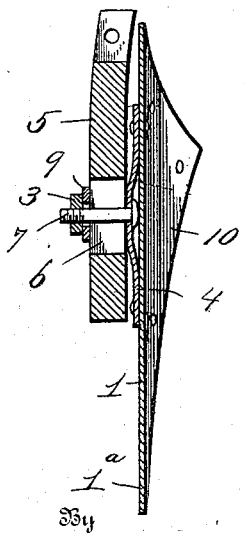

Figure 1 is a rear perspective view showing the shovel attached to a foot. Fig. 2 is a horizontal section therethrough, and Fig. 3 is a vertical section.

Referring to the figures by numerals of reference, 1 is a shovel of ordinary construction having a V-shaped point 1$^a$. To one edge of the shovel is riveted or otherwise secured an angular wing 10, the lower edge of which is in alinement with one edge of the point of the shovel. A bracing-strap 9 is fastened to the rear face of this wing at a point adjacent to the outer end thereof, and this strap has a slot 8 therein for the reception of a bolt 7. The foot 5 of the shovel has a slot 6 therein which receives the bolt 7, and said bolt also extends through a horizontal slot 4$^a$, formed within a curved block 4, which is secured to the rear face of shovel 1, preferably at the center thereof. The foot 5 and strap 9 are clamped together in position within block 4 by means of a nut 3.

When it is desired to use the shovel for opening furrows, the parts are arranged in the position shown in Fig. 1 and can, if desired, be adjusted to any angle in relation to the block 4 by sliding the bolt 7 longitudinally within slot 4$^a$ until the proper position has been reached and then clamping the parts together by means of the nut 3. If it is desired to employ the shovel for scraping, the nut is loosened upon the bolt and shovel 1 and the block 4 thereon turned until the edge of wing 10 and one side of the point of the shovel are brought into horizontal position. The parts are then clamped together by means of nut 3. The strap 9 serves as a brace for the wing and will prevent the same from giving backward when considerable strain is exerted thereupon. It will be understood that the wing and its strap may be attached to any ordinary shovel, and, if desired, the particular form of block herein shown may be dispensed with. If desired, the wing 10 may be formed integral with the shovel 1.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new, and desired to be secured by Letters Patent, is—

1. A shovel attachment comprising an angular wing, and a bracing-strap secured to the rear face thereof.

2. The combination with a shovel; of an angular wing secured to one edge in alinement with one edge of the point of the shovel, a bracing-strap secured to said wing, and means for clamping a foot between said strap and shovel.

3. The combination with a shovel having a slotted block secured upon the rear face thereof; of an angular wing fastened to one edge of the shovel and having a working edge in alinement with one of the working edges of the shovel, a bracing-strap secured to the rear face of the wing, and means for clamping a foot between said strap and the block.

4. The combination with a shovel having a transversely-slotted curved block secured upon the rear face thereof; of an angular wing at one edge of the shovel and having its working edge in alinement with one of the working edges of the shovel, a bracing-strap secured to the rear face of the wing and having a slot therein, and a bolt adjustable within the slot in the block and adapted to engage the slot and clamp a foot between the block and strap.

In testimony whereof I affix my signature in presence of two witnesses.

ALVIS L. JOHNSON.

Witnesses:
P. F. BURROWS,
J. O. ASHENHURSS.